US010048058B2

(12) United States Patent
Cosic et al.

(10) Patent No.: US 10,048,058 B2
(45) Date of Patent: Aug. 14, 2018

(54) DATA CAPTURE SYSTEM FOR TEXTURE AND GEOMETRY ACQUISITION

(71) Applicant: Microsoft Technology Licensing, LLC, Redmond, WA (US)

(72) Inventors: Zanin Cosic, Austria (AT); Hannes Hegenbarth, Austria (AT); Martin Ponticelli, Austria (AT); Gerald Schweighofer, Austria (AT); Mario Sormann, Austria (AT)

(73) Assignee: Microsoft Technology Licensing, LLC, Redmond, WA (US)

( * ) Notice: Subject to any disclaimer, the term of this patent is extended or adjusted under 35 U.S.C. 154(b) by 231 days.

(21) Appl. No.: 14/812,565

(22) Filed: Jul. 29, 2015

(65) Prior Publication Data

US 2017/0030703 A1    Feb. 2, 2017

(51) Int. Cl.
G01B 11/30 (2006.01)
G01B 11/02 (2006.01)
G01C 21/00 (2006.01)
G01C 11/00 (2006.01)
G01S 17/02 (2006.01)
G01S 17/89 (2006.01)
G01S 13/86 (2006.01)
G01S 13/89 (2006.01)

(52) U.S. Cl.
CPC .............. *G01B 11/02* (2013.01); *G01B 11/30* (2013.01); *G01C 11/00* (2013.01); *G01C 21/00* (2013.01); *G01S 13/86* (2013.01); *G01S 13/89* (2013.01); *G01S 17/023* (2013.01); *G01S 17/89* (2013.01)

(58) Field of Classification Search
CPC ......... G01B 11/30; G01B 11/02; G01C 11/00; G01C 21/00; G01S 13/86; G01S 13/89; G01S 17/023; G01S 17/89
See application file for complete search history.

(56) References Cited

U.S. PATENT DOCUMENTS

| 8,602,887 | B2 | 12/2013 | Tardif et al. |
| 2003/0210180 | A1 | 11/2003 | Hager et al. |
| 2008/0024594 | A1 | 1/2008 | Ritchey |
| 2008/0035402 | A1 | 2/2008 | Amira et al. |
| 2009/0141933 | A1 | 6/2009 | Wagg |
| 2012/0113209 | A1 | 5/2012 | Ritchey et al. |

(Continued)

FOREIGN PATENT DOCUMENTS

| CN | 204155059 | 2/2015 |
| WO | 2015085483 | 6/2015 |

OTHER PUBLICATIONS

PCT International Search Report in PCT/US2016/044443, dated Oct. 26, 2016, 13 pages.

(Continued)

*Primary Examiner* — Bryan Bui

(57) ABSTRACT

Examples of the present disclosure describe systems and methods for capturing data to acquire indoor and outdoor geometry. In aspects, a data capture system may be configured to acquire texture data, geometry data, navigation data and/or orientation data to support geolocation and georeferencing within indoor and outdoor environments. The data capture system may further be configured to acquire seamless texture data from a 360° horizontal and vertical perspective to support panoramic video and images.

20 Claims, 8 Drawing Sheets

(56) References Cited

U.S. PATENT DOCUMENTS

| | | |
|---|---|---|
| 2013/0063550 A1 | 3/2013 | Ritchey et al. |
| 2014/0071234 A1 | 3/2014 | Millett |
| 2015/0049325 A1 | 2/2015 | Curtis |
| 2015/0094089 A1* | 4/2015 | Moeglein ............ G06K 9/00671 |
| | | 455/456.1 |
| 2015/0193971 A1 | 7/2015 | Dryanovski |

OTHER PUBLICATIONS

"Preliminary Report on Patentability Issued in PCT Application No. PCT/US2016/044443", dated Jul. 12, 2017, 07 Pages.

* cited by examiner

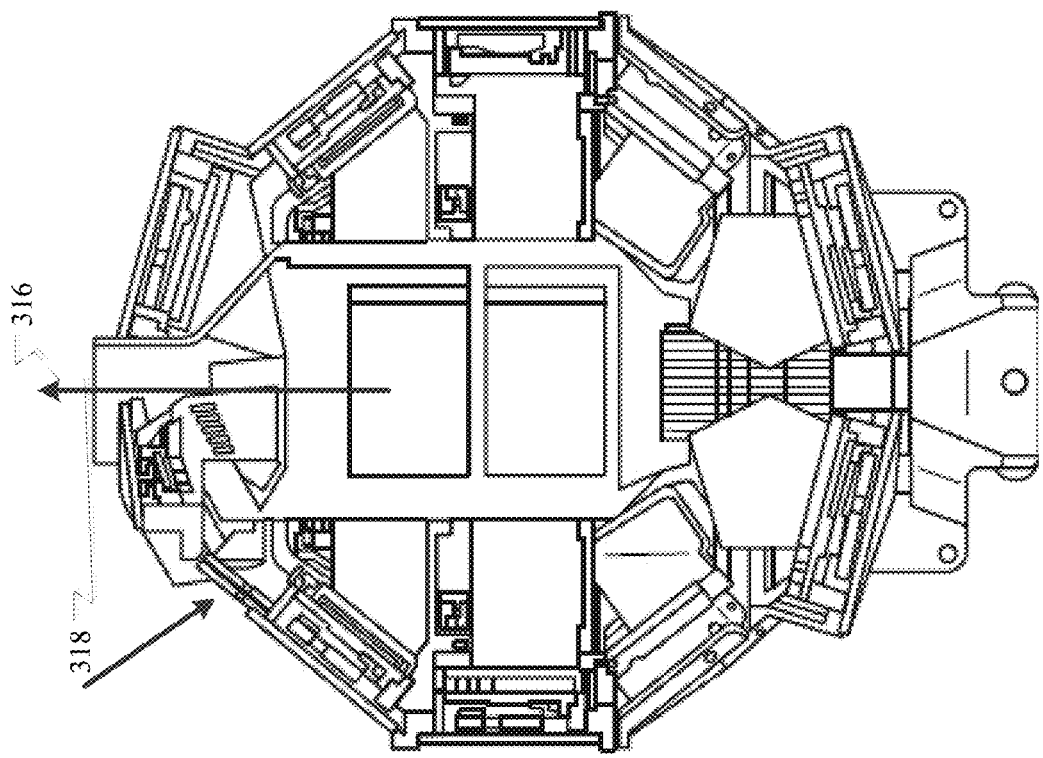
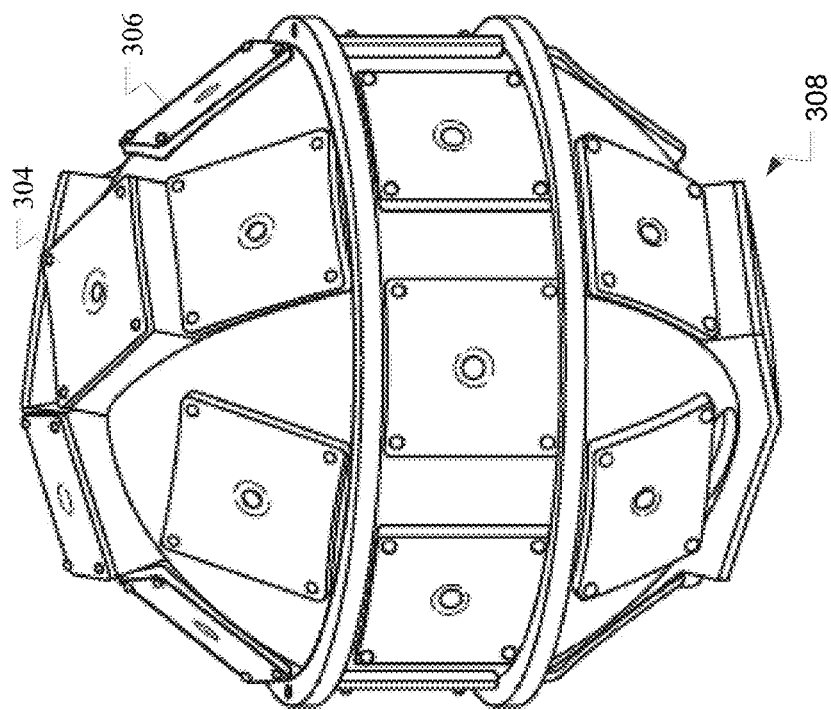
FIG. 3B
FIG. 3A

DATA CAPTURE SYSTEM FOR TEXTURE AND GEOMETRY ACQUISITION

BACKGROUND

Mobile mapping is the process of collecting geospatial data from a mobile device fitted with a one or more remote sensing systems. The Global Navigation Satellite System (GNSS), for example, is a satellite navigation system that provides location and mapping information on or near the surface of the earth. Typically, because GNSS requires a line of sight to a plurality of satellites, GNSS will not function through obstructions (e.g., indoors). For such reasons, alternate portable systems must be used to provide location and mapping information for many urban areas and indoor environments.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Examples of the present disclosure describe systems and methods for capturing data to acquire indoor and outdoor texture and geometry. In aspects, a data capture system may be configured to acquire texture data, geometry data, navigation data and/or orientation data to support geolocation and georeferencing within indoor and outdoor environments. The data capture system may further be configured to acquire seamless texture data from a 360° horizontal and vertical perspective to support panoramic video and images.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 3A illustrates an exemplary panoramic head as described herein.

FIG. 3B illustrates an exemplary active and passive cooling system of the panoramic head of FIG. 3A as described herein.

DETAILED DESCRIPTION

Figure 1:
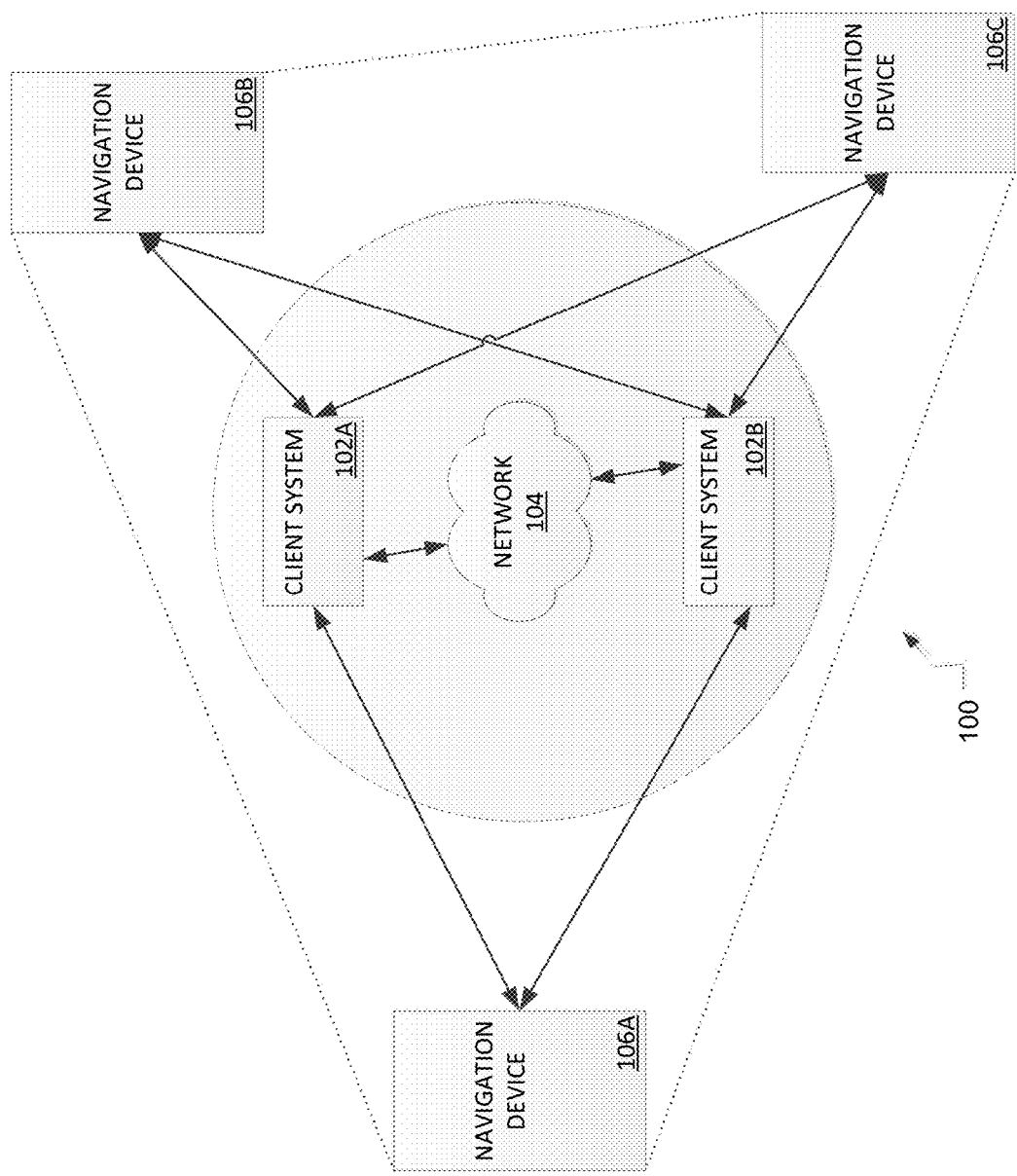
FIG. 1 illustrates an overview of an example system for capturing data to acquire indoor and outdoor texture and geometry as described herein.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure provides systems and methods for capturing data to acquire indoor and outdoor texture and geometry. In aspects, a data capture system may be configured to acquire texture data, geometry data, navigation data and/or orientation data to support geolocation and georeferencing in indoor and outdoor environments. Georeferencing, as used herein, may refer to a process of associating a physical map or an image of a map, for example, with spatial locations. The data capture system may further be configured to acquire seamless texture data from a 360° horizontal and vertical perspective to support panoramic video and images.

In examples, a data capture system may receive data from a navigation system, such as a Global Navigation Satellite System (GNSS). The GNSS, for example, may be configured to provide autonomous geo-spatial positioning with global coverage and to provide time signals that allows a receiver to determine its location with precision (e.g., within a few meters). The GNSS may be configured to provide such data along a line of sight to the receiver, such that an obstruction to the line of sight between the GNSS and the receiver precludes the transmission of the information. In another example, the data capture system may receive data from a cellular network system. The cellular network system may be configured to provide the position of a mobile device using radio signals emitted by a plurality of radio towers at known locations that broadcast signals at regular intervals. The cellular network system may use techniques to locate the mobile device, such as triangulation, multilateration and trilateration.

The data capture system may perform a kinematic alignment after receiving the data. Kinematic alignment, as used herein, may refer to the process of computing the GNSS-based position of a receiver and positioning the receiver such that a GNSS antenna and an inertial measurement unit (IMU) associated with the receiver are aligned. In aspects, performing a kinematic alignment allows the data capture system to synchronize one or more sensors associated with the data capture system. Synchronizing the sensors allows the data capture system to acquire synchronized sensor data. Synchronized sensor data, as used herein, may refer to data acquired from sensors that have been aligned in time (e.g., via a single source clock) or position with respect to each other or a common point of reference. Examples of sensors may include Light Detection and Ranging (LIDAR) sensors, optical sensors, acoustical sensors, magnetic sensors, gyroscopic sensors, mechanical sensors, etc.

The data capture system may record the synchronized sensor data. The sensor data may comprise images, video, geometry, surface properties, navigational data and/or orientation data of the surrounding environment and/or the data capture system. In some aspects, the sensor data may be affixed with the global time retrieved from the GNSS. In other aspects, the GNSS data may not be available and the sensor data may be affixed with the local time. In aspects, the data capture system may update its position at intervals (e.g., continuously, periodically, on-demand, etc.) and may transmit the positional data to one or more computing units. One skilled in the art will recognize that examples described in the present disclosure may be applicable to alternate systems or devices.

FIG. 1 illustrates an overview of an example system 100 for capturing data to acquire indoor and outdoor texture and geometry as described herein. Exemplary system 100 presented is a combination of interdependent components that interact to form an integrated whole for improving recommendations from implicit feedback. Components of the systems may be hardware components or software implemented on and/or executed by hardware components of system 100. In examples, system 100 may include any of hardware components (e.g., used to execute/run operating system (OS)), and software components (e.g., applications, application programming interfaces, modules, virtual machines, runtime libraries, etc.) running on hardware. In one example, an exemplary system 100 may provide an environment for software components to run, obey constraints set for operating, and makes use of resources or facilities of the system 100, where components may be software (e.g., application, program, module, etc.) running on one or more processing devices. For instance, software (e.g., applications, operational instructions, modules, etc.) may be run on a processing device such as a computer, mobile device (e.g., smartphone/phone, tablet) and/or any other electronic devices. As an example of a processing device operating environment, refer to the exemplary operating environments depicted in FIGS. 5-7. In other examples, the components of systems disclosed herein may be spread across multiple devices. For instance, input may be entered on a processing device and information may be processed or accessed from other devices in a network such as one or more server devices.

As one example, the system 100 comprises client system 102A, client system 102B, distributed network 104, navigation device 106A, navigation device 106B and navigation device 106C. One of skill in the art will appreciate that the scale of systems such as system 100 may vary and may include more or fewer components than those described in FIG. 1. In some examples, interfacing between components of the system 100 may occur remotely, for example where components of system 100 may be spread across one or more devices of a distributed network.

In aspects, client system 102A may be configured to acquire the object geometry and object surface properties of the surrounding environment in order to perform photogrammetry and object reconstruction. In one example, client system 102A may receive signal data from one or more satellites, such as navigation devices 106A, 106B, and 106C. Navigation device 106A, for example, may be configured to broadcast or transmit information about its position and the current time at regular (or irregular) intervals to one or more receivers. Client system 102A may timestamp the signal data with a global time of the one or more satellites, and perform kinematic alignment for one or more components of client system 102A. Client system 102A may then record sensor data from the surrounding environment, including texture data, geometry data, navigation data and/or orientation data for one or more objects. The global time received from the signal data may be applied to the respective sensor data as it recorded. The sensor data may be provided to a processing component of, or associated with, the client system 102A as feedback. For example, client system 102A may transmit the sensor data to client system 102B via distributed network 104. The processing component may process the sensor data and provide traveled trajectory and/or object geometry data to a user interface. In another example, signal data may not be available to client system 102A or the signal data may be insufficient. In such an example, the recorded sensor data may not be time-stamped or may be time-stamped with the local time.

In some aspects, client system 102A and client system 102B may be configured to simultaneously or alternately receive signal data from the one or more satellites and/or record sensor data from the surrounding environment(s). For example, client system 102A and client system 102B may be in separate locations (e.g., 20 miles apart). Client system 102A may be configured to receive signal data from one or more satellites. Client system 102A may parse the signal data to identify global time data and may transmit the global time data to client system 102B. Client system 102B may acquire record sensor data from the surrounding environment and may and may apply the received global time data to the sensor data. The sensor data may then be processed by client system 102B or transmitted to a separate computing device for processing a display on a user interface.

Figure 2B:
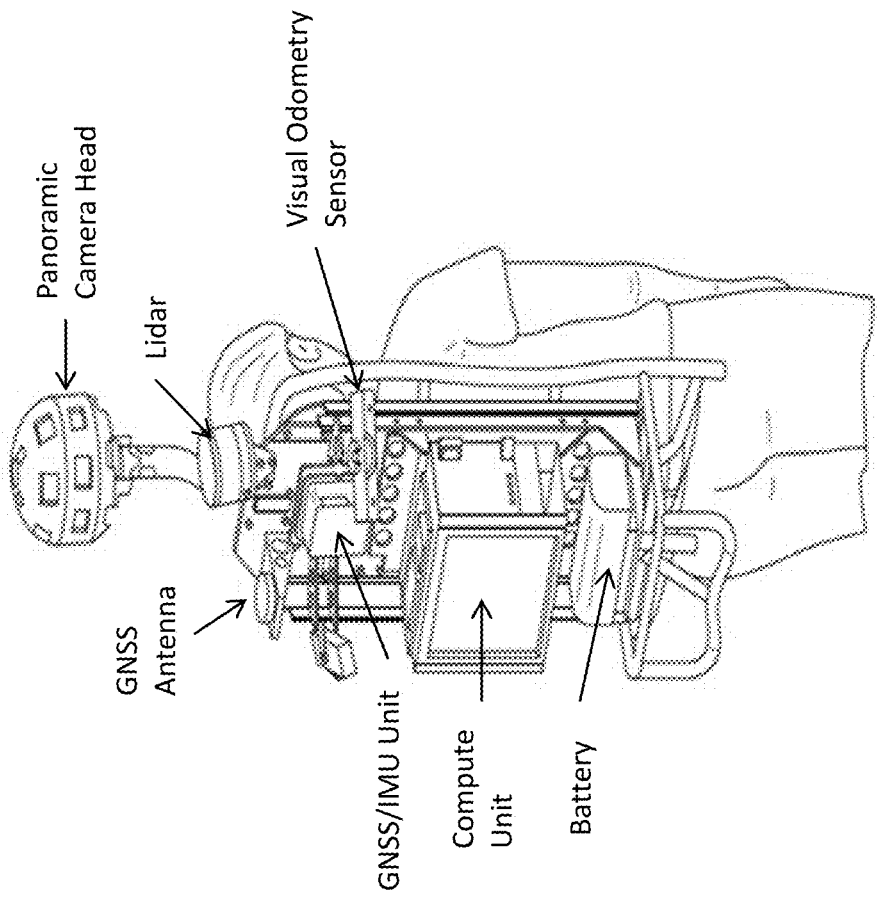
FIG. 2B illustrates an exemplary data capture system mounted to a rigid frame as described herein.
Figure 2A:
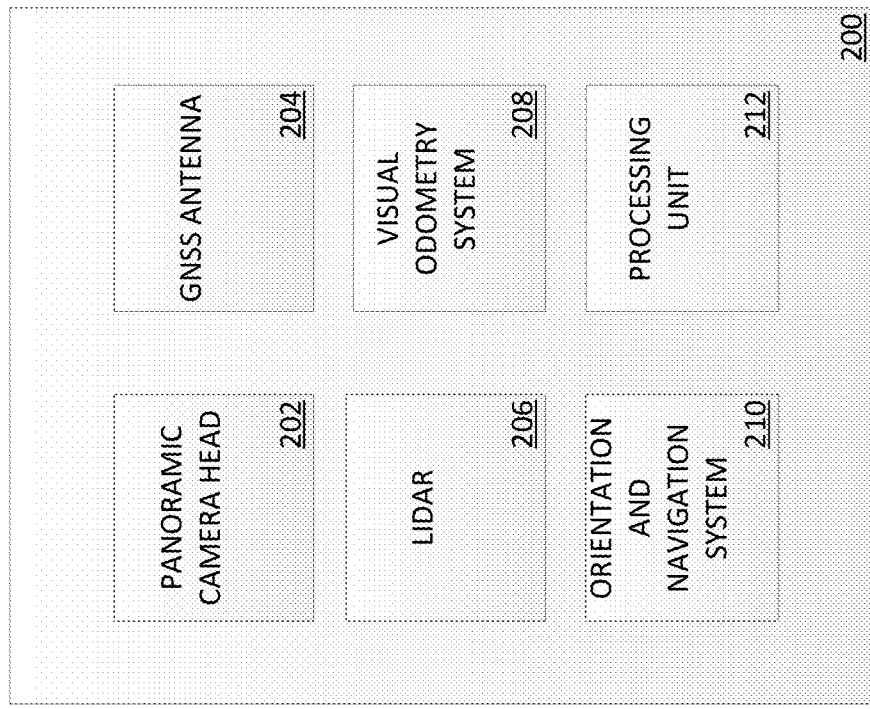
FIG. 2A illustrates an exemplary data capture system as described herein.

FIG. 2A illustrates an overview of a data capture system 200 as described herein. The data capture techniques implemented by data capture system 200 may comprise the data capture techniques and input described in FIG. 1. In alternative examples, multiple system (comprising one or more components such as processor and/or memory) may perform the processing described in systems 100 and 200, respectively. Further, data capture system 200 may comprise a user interface component as described in the description of FIG. 1.

Exemplary data capture system 200 may comprise panoramic head 202, visual odometry system 208, LIDAR sensor system 206, GNSS antenna 204, orientation and navigation system 210, and/or processing unit(s) 212. In aspects, one or more these components may be mounted to a rigid frame. In some aspects, the rigid frame and mounted components may be configured to be portably maneuvered about an environment. Alternately or additionally, the rigid frame may be configured to be positioned on a stationary device (e.g., a tripod).

In a particular example, as shown in FIG. 2B, a rigid frame may be substantially rectangular. The rigid frame may comprise a length and width that approximates a backpack or that is suitable for transport via a human user. The rigid frame may include a rectangular shelf that is attached orthogonally from the rigid frame. The shelf may comprise a width that is substantially similar to the rigid frame and a length that is approximately one-third the length of the rigid frame. The shelf may be positioned at or near the bottom of the rigid frame and may include a stand. The stand may by attached orthogonally to the shelf and may extend from the bottom of the shelf, such that the rigid frame may be will remain upright when placed on a flat surface. Panoramic head 202 may be attached to (and extend from) the top of the rigid frame, such the panoramic head is afforded a view that is minimally occluded by the user and/or the other components of data capture system 200. LIDAR sensor system 206 may also be attached to (and extend from) the top of the rigid frame, such that the line of sight to objects in the environment is unobstructed. GNSS antenna 204 may be attached to a construct that is mounted to the rigid frame. The construct may be similar in length and height to the rigid construct and may be configured to securely affix one or more components of data capture system 200. GNSS antenna 204 may be positioned near the top of the construct to reduce signal interference. Visual odometry system 208 and orientation and navigation system 210 may be attached to the construct below GNSS antenna 204. Processing unit(s) 212 may be attached to the construct below visual odometry system 208 and orientation and navigation system 210.

Panoramic head 202 may be configured with a plurality of individual optical cameras, such that the combined field of view of the individual cameras represents complete (or substantially complete) coverage of the surrounding environment (e.g., a 360 degree view). In some aspects, as illustrated in FIG. 3A, the individual cameras 302, 304, 306, for example, may be mounted to a rigid construction 308 such that the physical distance of the focal points of each individual camera to the focal point of one or more adjacent cameras is small enough to avoid visible parallaxes in the panoramic image. In examples, the individual cameras may be configured to acquire input data, such as images, still video, video, infrared light, x-ray radiation, etc.

Visual odometry system 208 may be configured to use input data (e.g., images, still video, and/or video) to calculate a change in position over time. Visual odometry, as used herein, may refer to the process of determining odometry information using visual data to estimate the distance traveled. Visual odometry systems may be used in, for example, robotic applications (e.g., Hans Moravec's work with the Stanford Cart), autonomous flight applications (e.g., the Mars Exploration Rovers) and ground vehicle applications (e.g., urban mapping and georeferencing). In aspects, visual odometry system 208 may acquire input data and establish a correspondence between two or more portions of the input data. In a particular example, establishing a correspondence comprises defining one or more interest operators across a plurality of images and matching the interest operators across two or more images. Interest operators, as used herein, may refer to algorithms which detect features of interest in an image, such as corners, edges, objects, etc. Visual odometry system 208 may construct an optical flow field using the established correspondence. An optical flow field, as used herein, may refer to a representation of the apparent motion of objects, surfaces and edges in a visual scene caused by the relative motion between and observer and the scene. In a particular example, a plurality of images may be used to construct an optical flow field that may be analyzed by a visual odometry system for potential tracking errors and outliers. Visual odometry system 208 may then estimate the motion of the camera(s) from the optical flow field. Estimates of the motion may be generated using techniques such as linear quadratic estimation (LQE) for state estimate distribution maintenance or random sampling to find the geometric and three dimensional properties of the features that minimize a cost function.

LIDAR sensor system 206 may be configured to measure the distance between the LIDAR sensor system 206 and one or more objects. LIDAR sensor systems may be used, for example, to create high-resolution maps for applications in geomatics, archaeology, geography, geology, seismology, remote sensing, atmospheric physics, laser altimetry and contour mapping. In examples, LIDAR sensor system 206 may fire rapid pulses of laser light at the surface of one or more objects and measures the amount of time that each pulse takes to bounce of the objects and return to a sensor on LIDAR sensor system 206. The LIDAR sensor data may enable LIDAR sensor system 206 to measure and map a 3D representation of the surrounding environment. For example, the sensor data may be used to construct one or more depth images of objects in the surrounding environment. A geometry may be constructed to represent the objects using the depth images. The geometry may be void of texture data and colors data, but may include spatial relationship data of the objects in the environment. In some aspects, LIDAR sensor system 206 may be used to create a three dimensional representation of urban environments (e.g., via street-side data) and/or indoor environments (e.g., shopping malls, airport buildings, a single room, etc.).

GNSS antenna 204 may be configured to receive data from a navigation system, such as a GNSS. In examples, GNSS antenna 204 may capture the signals transmitted by one or more satellites and may convert the energy in the electromagnetic waves, for example, arriving from the satellites into an electric current that is further processed by a receiver. The data may comprise, for example, ranging signals for measuring the distance to the satellite. The data may also comprise navigation messages for calculating the position of each satellite in orbit and relaying information about the time and status of an entire satellite constellation (e.g., the almanac). In some aspects, GNSS antenna 204 may be mounted on a rigid frame of data capture system 200.

Orientation and navigation system 210 may be configured to acquire received data from GNSS antenna 204 and interpolate movement data for data capture system 200. Orientation and navigation systems may be used to, for example, maneuver airborne systems (e.g., unmanned aerial vehicles and aircrafts), ground vehicles and devices, and aquatic systems (e.g., submarines and probes). In aspects, orientation and navigation system 210 may measure an object's velocity, orientation and gravitational forces using various sensors, such as accelerometers, gyroscopes, and/or magnetometers. In a particular example, orientation and navigation system 210 may measure the position and orientation of data capture system 200 as data capture system 200 is moved about an environment. Orientation and navigation system 210 may then calculate the subsequent position of the data capture system 200 using known or estimated speeds over elapsed time and course. In some aspects, orientation and navigation system 210 may be mounted on a rigid frame of data capture system 200.

Processing unit(s) 212 may be configured to receive and process data from one or more of the other components of input processing unit 200. In aspects, processing unit(s) 212 may synchronize the sensors of each component of input processing unit 200; receive and stitch together input data from panoramic head 202; process the input operators and store the optical flow field of visual odometry system 208;

create a three dimensional representation of an environment using the sensor data of LIDAR sensor system 206 and/or the movement data of orientation and navigation system 210; perform various techniques for image correction (e.g., rolling shutter effect compensation); and/or provide the three dimensional representation (and/or other information) to a user interface.

In aspects, data capture system 200 may be configured to provide occlusion management for seamless panoramic coverage. In examples, the individual cameras mounted on panoramic head 202 may be configured in an arrangement such that those portions of an individual camera field of view which are occluded are captured by at least one of the other individual cameras. In a particular example, the physical distance of the focal points of each camera to the focal points of the adjacent camera is approximately 60 mm. The input data acquired by panoramic head 202 may then be stitched together by software executing on processing unit(s) 212, for example, to create a seamless panoramic image or video. Stitching, as used herein, may refer to combining multiple, partially-overlapping images of a scene to create a single, uninterrupted image of the scene.

In some aspects, data capture system 200 may be further or alternately configured to provide for synchronization of various components of the input processing unit 200. In examples, one or more sensors from one or more components of the input processing unit 200 may be synchronized by processing unit(s) 212. The synchronization may be such that the geometry reconstruction results (e.g., the three dimensional mapping by, for example, LIDAR sensor system 206) and the positional recognition of each sensor may be transformed into a combined spatial coordinate system. The six parameters of such transformation (e.g. three dimensional translation and rotation) are carefully determined from a calibration procedure for one or more components of the system and describe in such way pose and position of the individual component (e.g., the sensor associated with the component) with respect to the rigid frame of the data capture system. The combined spatial coordinate system may be constructed such that the accuracy of the synchronized sensors is maintained even if data capture system 200 is in motion during data acquisition. In some examples, the synchronization of the sensors may be managed via a quartz clock that is coupled to, or accessible by, processing unit(s) 212. The quartz clock may provide for, for example, frame by frame synchronization of video captured by one or more individual cameras of panoramic head 202.

In aspects, data capture system 200 may be further or alternately configured with an active/passive cooling system. In examples, the individual cameras of panoramic head 202 may gradually increase in heat during operation. To combat overheating of the individual cameras, panoramic head 202 comprises an active cooling system and a passive cooling system. FIG. 3B illustrates an exemplary active and passive cooling system of panoramic head 202. The cooling system is designed in such way that an air stream is guided through the panoramic sensor head in order to transport the caloric energy produced from the one or multiple optical camera heads and the active part of the cooling system boosts the air stream if the natural convection is not efficient. In FIG. 3B, the active part of the cooling system is situated in the middle portion of the panoramic head and includes a fan assembly and a flow channel, as indicated by the arrow 316. In some examples, the fan assembly may be configured to provide cooled air to flow channel. Flow channel may be configured to receive and carry the cooled air to one or more individual cameras, to portions of the panoramic head, and/or to other components of a data capture system. Continuing with FIG. 3B, the passive part of the cooling system indicated by the arrow 318 incorporates a design of the panoramic head that supports dispersing the cooled air provided by the fan assembly and cooling the individual cameras. In some examples, the design may comprise equipping one or more individual cameras with one or more cooling fins. The cooling fins may be configured to enhance the cooling effect of the cooled air to the one or more individual cameras.

In aspects, data capture system 200 may be further or alternately configured with a flexible software readout mechanism. The flexible software readout mechanism may allow a user to use configurable software settings to select and alter the read out direction for each camera and thus, the behavior of the rolling shutter effects. In examples, one or more individual cameras of data capture system 200 may use rolling shutter. Rolling shutter, as used herein, may refer to a method of image capture in which a still picture or each frame of a video is captured by rapidly scanning a scene, instead of taking a snapshot of the entire scene at a single instant in time. In some examples, the images generated using rolling shutter may be distorted when the one or more individual cameras are moving relative to the object being captured. The effect may worsen when the images are stitched together and the effect of each image is seen to point in different directions. In such examples, the flexible software readout mechanism may allow for a selection of the readout direction for each individual camera sensor. This selection may allow the images to be altered such that the image distortion for each image is at the same magnitude and direction as those of the adjacent image; thus providing an accurately stitched together image.

Accordingly, the present disclosure provides a plurality of technical benefits including but not limited to: panoramic video and image capture; occlusion management; active and passive cooling techniques; video input device synchronization, rolling shutter effects compensation; data capture time and resource cost reduction; and improved image quality, among other examples.

Figure 4:
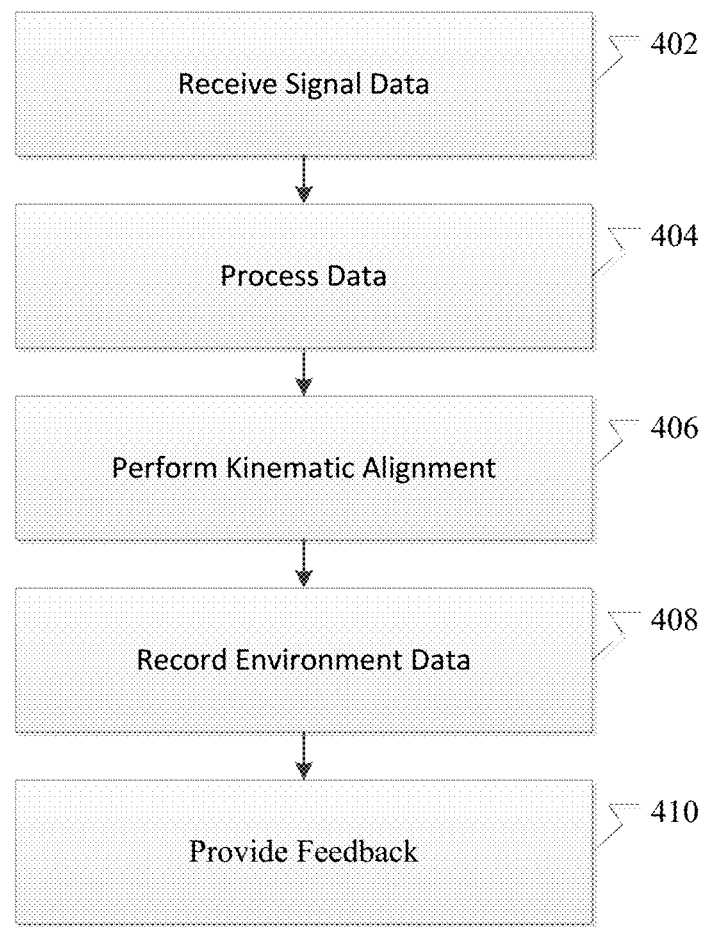
FIG. 4 illustrates an example method of mapping indoor and outdoor texture and geometry as described herein.

FIG. 4 illustrates a process flow associated with a data capture system for indoor and outdoor texture and geometry as described herein. In aspects, method 400 may be executed by an exemplary system such as system 100 of FIG. 1. In examples, method 400 may be executed on a device comprising at least one processor configured to store and execute operations, programs or instructions. However, method 400 is not limited to such examples. In other examples, method 400 may be performed on an application or service for processing video and/or images. In at least one example, method 400 may be executed (e.g., computer-implemented operations) by one or more components of a distributed network, for instance, web service/distributed network service (e.g. cloud service) to leverage signal data analysis, graphical processing and statistical analysis.

Exemplary method 400 begins at operation 402 where signal data is received by a data capture system. The signal data may be received from a navigation system, such as GNSS. The GNSS may be configured to provide such data along a line of sight to the receiver, such that an obstruction to the line of sight between the GNSS and the receiver precludes the transmission of the information. The signal data may comprise geo-spatial positioning information and time signals that allow a receiver to accurately determine the location of the GNSS.

At operation 404, the signal data may be processed by the data capture system. In examples, processing the signal data may include parsing the signal data to identify various pieces of information, such as geo-spatial positioning information and global time signals. In one particular example, the geo-spatial positioning information may be transmitted to a storage location and tracked over time. The global time signals may be used create one or more timestamps. The timestamps may be transmitted to one or more components of the data capture system to pair with, and/or affix to, images, video, sill video and/or other sensor data.

At operation 406, the data capture system may perform a kinematic alignment after receiving the signal data. In aspects, one or more components of the data capture system may be mounted to a portable rigid frame. The position of one or more sensors of the one or more components may be calibrated in pose and position with respect to the rigid frame. In examples, this calibration (e.g., kinematic alignment) provides each sensor coordinate system with, for example, a three dimensional orientation by measuring gravity and the movement direction of the sensor. The calibration also allows the use of timestamps to synchronize each sensor (or sensor system) to a common clock associated with the data capture system and a spatial coordinate system with position and orientation of the data capture system.

At operation 408, the data capture system may record environmental data. In aspects, one or more components of the data capture system may simultaneously or alternately acquire data from the surrounding environment. For example, a LIDAR sensor may measure and record the distance between the LIDAR sensor and one or more objects in the environment at intervals. The LIDAR sensor data may be used to measure and map a three dimensional representation of the surrounding environment. As another example, a panoramic head may record image images, still video, and/or video of an environment. The image data may be used to provide color and texture to geometry created by, for example, the LIDAR sensor. As another example, a visual odometry system may record the change in position over time of one or more sensors of the data capture system. The change in position data may be used to establish a correspondence between two or more portions of the input data. In yet another example, an orientation and navigation system may record the velocity, orientation and gravitational forces on one or more objects in the environment. This data may be used to interpolate movement data within the image data acquired and generated by the data capture system.

In aspects, the recorded environmental data may be affixed with timestamps derived from the global time received from the GNSS. In other aspects, the GNSS signal data may not be available because, for example, the line of sight between the GNSS and the receiver is obstructed. In such aspects, timestamps may be generated using the local time of a common clock associated with the data capture system. The recorded environmental data may be affixed with timestamps derived from the common clock. In a particular example, the common clock is a quartz clock by which all of the sensors of the data capture system are managed. The timestamps may allow the data capture system to accurately identify the sequence in which the environmental data (e.g., images, video, etc.) was recorded. The data capture system may then use the timestamps to pair the environmental data with data from other sensors of the data capture system.

At operation 410, the data capture system may provide feedback to a user interface. In examples, the feedback may comprise various pieces of information, such as a colored and textured three dimensional representation of the surrounding environment, a video rendering, sensor data from one or more components of the data capture system, signal data from the GNSS, data and graphics analysis information, presentation options, etc. In some examples, the feedback may be viewed on a user interface that is communicatively coupled to the data capture system. In other examples, the feedback may be transmitted to a remote computing device having access to a user interface.

Figure 5:
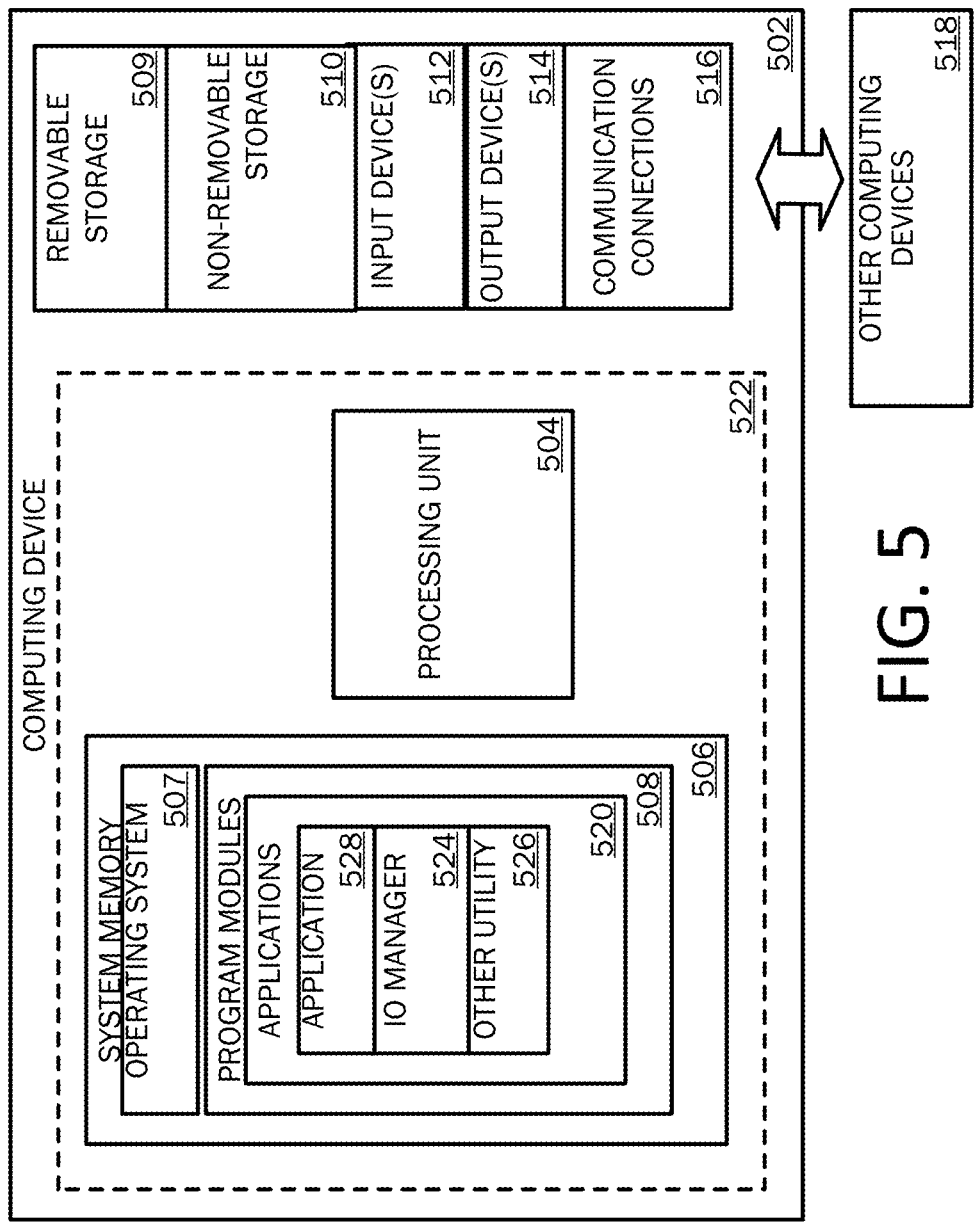
FIG. 5 is a block diagram illustrating an example of a computing device with which aspects of the present disclosure may be practiced.
Figure 6A:
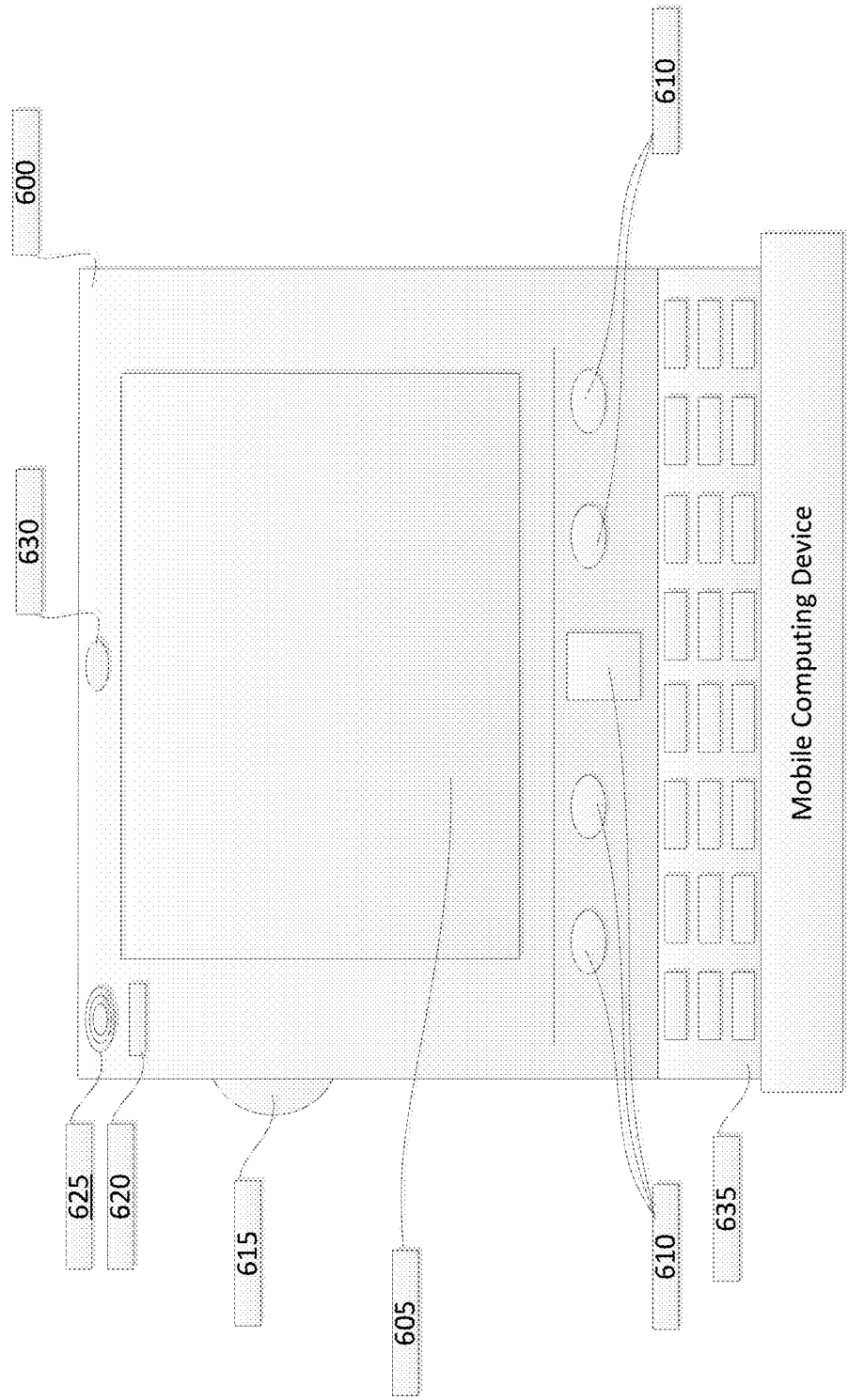
FIGS. 6A and 6B are simplified block diagrams of a mobile computing device with which aspects of the present disclosure may be practiced.
Figure 6B:
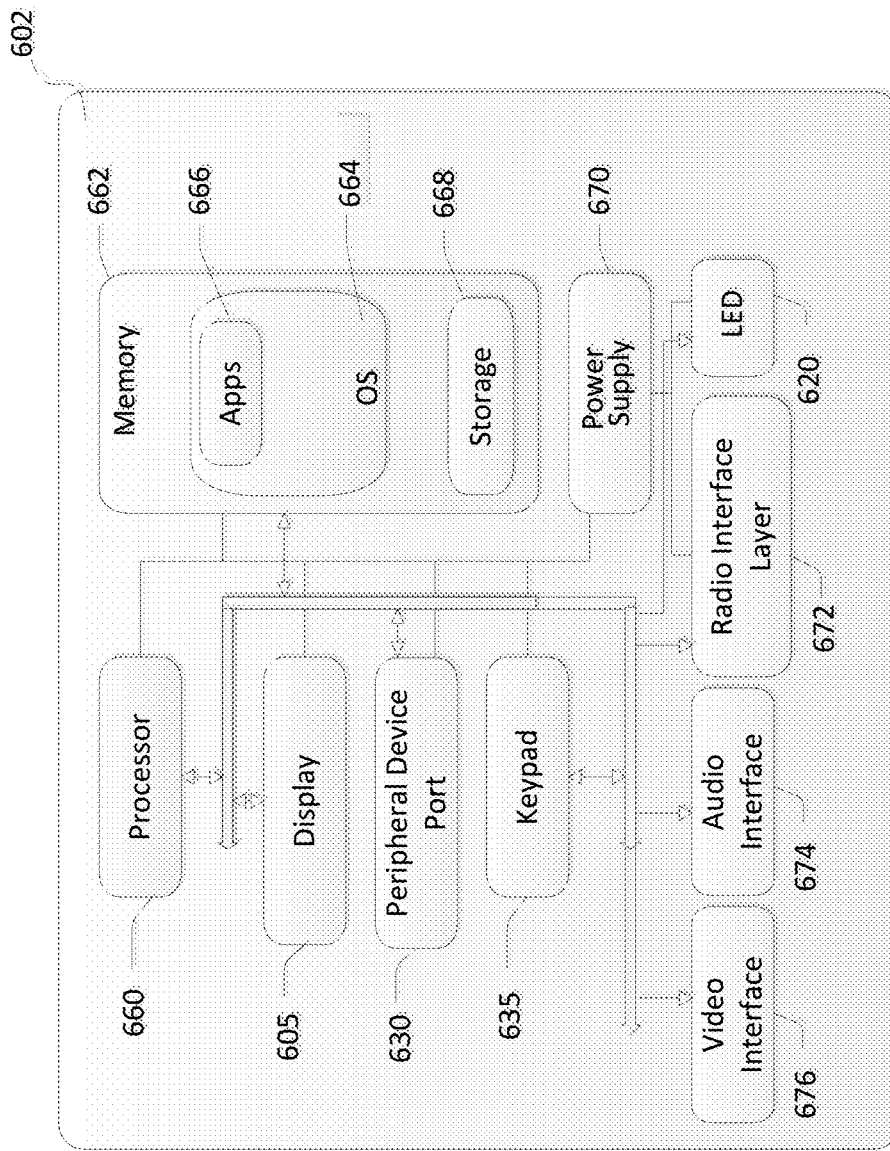
Figure 7:
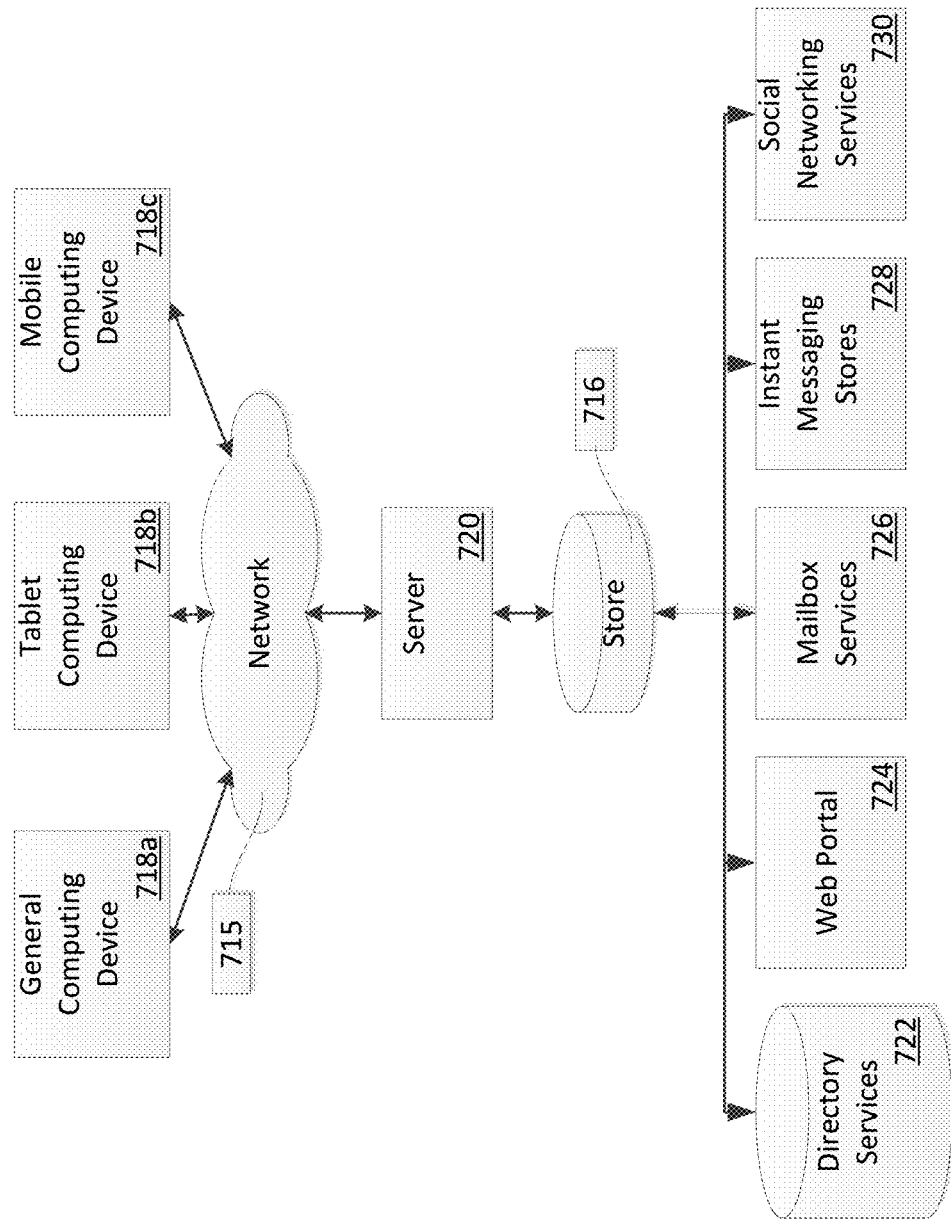
FIG. 7 is a simplified block diagram of a distributed computing system in which aspects of the present disclosure may be practiced.

FIGS. 5-7 and the associated descriptions provide a discussion of a variety of operating environments in which examples of the invention may be practiced. However, the devices and systems illustrated and discussed with respect to FIGS. 5-7 are for purposes of example and illustration and are not limiting of a vast number of computing device configurations that may be utilized for practicing examples of the invention, described herein.

FIG. 5 is a block diagram illustrating physical components of a computing device 502, for example a component of a system with which examples of the present disclosure may be practiced. The computing device components described below may be suitable for the computing devices described above. In a basic configuration, the computing device 502 may include at least one processing unit 504 and a system memory 506. Depending on the configuration and type of computing device, the system memory 506 may comprise, but is not limited to, volatile storage (e.g., random access memory), non-volatile storage (e.g., read-only memory), flash memory, or any combination of such memories. The system memory 506 may include an operating system 507 and one or more program modules 508 suitable for running software applications 520 such as application 528, 10 manager 524, and other utility 526. As examples, system memory 506 may store instructions for execution. Other examples of system memory 506 may be components such as a knowledge resource or learned program pool, as examples. The operating system 507, for example, may be suitable for controlling the operation of the computing device 502. Furthermore, examples of the invention may be practiced in conjunction with a graphics library, other operating systems, or any other application program and is not limited to any particular application or system. This basic configuration is illustrated in FIG. 5 by those components within a dashed line 522. The computing device 502 may have additional features or functionality. For example, the computing device 502 may also include additional data storage devices (removable and/or non-removable) such as, for example, magnetic disks, optical disks, or tape. Such additional storage is illustrated in FIG. 5 by a removable storage device 509 and anon-removable storage device 510.

As stated above, a number of program modules and data files may be stored in the system memory 506. While executing on the processing unit 504, the program modules 508 (e.g., application 528, Input/Output (I/O) manager 524, and other utility 526) may perform processes including, but not limited to, one or more of the stages of the operational method 400 illustrated in FIG. 4, for example. Other program modules that may be used in accordance with examples of the present invention may include electronic mail and contacts applications, word processing applications, spreadsheet applications, database applications, slide presentation applications, input recognition applications, drawing or computer-aided application programs, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 502 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 502 may also have one or more input device(s) 512 such as a keyboard, a mouse, a pen, a sound input device, a device for voice input/recognition, a touch input device, etc. The output device(s) 514 such as a display, speakers, a printer, etc. may also be included. The aforementioned devices are examples and others may be used. The computing device 504 may include one or more communication connections 516 allowing communications with other computing devices 518. Examples of suitable communication connections 516 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 506, the removable storage device 509, and the non-removable storage device 510 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 502. Any such computer storage media may be part of the computing device 502. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a personal data assistant, a tablet personal computer, a laptop computer, and the like, with which examples of the invention may be practiced. For example, mobile computing device 600 may be implemented as system 100, components of systems 100 may be configured to execute processing methods as described in FIG. 4, among other examples. With reference to FIG. 6A, one example of a mobile computing device 600 for implementing the examples is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative examples, mobile computing device 600 may incorporate more or less input elements. For example, the display 605 may not be a touch screen in some examples. In yet another alternative example, the mobile computing device 600 is a portable phone system, such as a cellular phone. The mobile computing device 600 may also include an optional keypad 635. Optional keypad 635 may be a physical keypad or a "soft" keypad generated on the touch screen display. In various examples, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 can incorporate a system (i.e., an architecture) 602 to implement some examples. In examples, the system 602 is implemented as a "smart phone" capable of running one or more applications (e.g., browser, e-mail, input processing, calendaring, contact managers, messaging clients, games, and media clients/players). In some examples, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600, including application 528, IO manager 524, and other utility 526 described herein.

The system 602 has a power supply 670, which may be implemented as one or more batteries. The power supply 670 might further include an external power source, such as an AC adapter or a powered docking cradle that supplements or recharges the batteries.

The system 602 may include peripheral device port 630 that performs the function of facilitating connectivity between system 602 and one or more peripheral devices. Transmissions to and from the peripheral device port 630 are conducted under control of the operating system 664. In other words, communications received by the peripheral device port 630 may be disseminated to the application programs 666 via the operating system 664, and vice versa.

The system 602 may also include a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with examples of the present invention, the microphone may also serve as an audio sensor to facilitate control of notifications, as will be described below. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

FIG. 7 illustrates one example of the architecture of a system for providing an application that reliably accesses target data on a storage system and handles communication failures to one or more client devices, as described above. Target data accessed, interacted with, or edited in association with application 528, IO manager 524, other utility 526, and storage may be stored in different communication channels or other storage types. For example, various documents may be stored using a directory service 722, a web portal 724, a mailbox service 726, an instant messaging store 728, or a social networking site 730, application 528, IO manager 524, other utility 526, and storage systems may use any of these types of systems or the like for enabling data utilization, as described herein. A server 720 may provide storage system for use by a client operating on general computing device 502 and mobile device(s) 600 through network 715. By way of example, network 715 may comprise the Internet or any other type of local or wide area network, and client nodes may be implemented as a computing device 502 embodied in a personal computer, a tablet computing device, and/or by a mobile computing device 600 (e.g., a smart phone). Any of these examples of the client computing device 502 or 600 may obtain content from the store 716.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A system comprising:
   at least one processor; and
   memory coupled to the at least one processor, the memory comprising computer executable instructions that, when executed by the at least one processor, performs a method comprising:
   receiving signal data;
   processing the signal data, wherein the processing comprises determining a time associated with the signal data;
   synchronizing one or more sensors of the system;
   using the one or more sensors, acquiring environmental data from an environment; and
   providing feedback associated with the acquired environmental data.

2. The system of claim 1, wherein the signal data is received from a global navigation system.

3. The system of claim 1, wherein the system comprises a rigid frame, wherein the one or more sensors are mounted to the rigid frame.

4. The system of claim 3, wherein the synchronizing comprises aligning the one or more sensors in pose and position with respect to the rigid frame.

5. The system of claim 1, wherein the acquiring comprises at least one of:
  measuring a distance between at least one of the one or more sensors and one or more objects in the environment;
  recording image data of the environment, wherein the image data comprises at least one of the group consisting of images, still video and video;
  recording a change in position over time of the one or more sensors; and
  measuring a velocity, an orientation, and gravitational forces of one or more objects in the environment.

6. The system of claim 1, wherein the environmental data is used to construct a geometry representing the environment, and wherein the environmental data is further used to texture the geometry.

7. The system of claim 6, wherein the environmental data is further used to interpolate movement data within the textured geometry.

8. The system of claim 1, wherein the feedback comprises a three-dimensional, textured representation of the environment.

9. The system of claim 1, further comprising: generating one or more timestamps using the time associated with the signal data, wherein the one or more timestamps are affixed to the environmental data.

10. A system comprising:
  an antenna configured to receive signal data;
  a panoramic head configured to acquire image data of an environment, wherein the image data comprises at least one of the group consisting of images, still video and video;
  a radar sensor configured to measure a distance between the radar sensor and one or more objects in an environment;
  a visual odometry sensor configured to determine a change in a position of the visual odometry sensor over time;
  an orientation and navigation sensor configured to determine a position, a velocity and an orientation of the orientation and navigation sensor; and
  a processing unit configured to process information received from at least one of the antenna, the panoramic head, the radar sensor, the visual odometry sensor, and the orientation and navigation sensor;
  wherein one or more sensors of the system are operable to be kinematically aligned upon receiving the signal data.

11. The system of claim 10, further comprising: a rigid frame, the rigid frame comprising the antenna, the panoramic head, the radar sensor, and the orientation and navigation sensor.

12. The system of claim 10, wherein the panoramic head comprises a rigid construction and a plurality of cameras, wherein the plurality of cameras are mounted to the rigid construction in a configuration that provides for a panoramic image of the environment.

13. The system of claim 12, wherein the plurality of cameras comprises a first camera having a first focal point and a second camera having a second focal point, wherein the first camera and the second camera are positioned with respect to one another to avoid visible parallaxes.

14. The system of claim 12, wherein the panoramic head comprises a cooling system having an active portion and a passive portion, wherein the active portion includes a fan assembly and the passive portion includes affixing cooling fins to one or more of the plurality of cameras.

15. The system of claim 12, further comprising: a software readout mechanism that provides for a selection of a readout direction for each of the plurality of cameras.

16. The system of claim 10, wherein processing the information comprises:
  constructing a geometry representing the environment, wherein the geometry is constructed based at least in part on the information; and
  applying a texture to the geometry.

17. The system of claim 16, wherein processing the information further comprises:
  identifying a correspondence between two or more portions of the information; and
  generating a representation of an apparent motion of one or more objects in the textured geometry.

18. The system of claim 10, further comprising a system clock, wherein at least the radar sensor, the visual odometry sensor, and the orientation and navigation sensor are synchronized to the system clock.

19. The system of claim 18, wherein the synchronized sensors are used to transform the information into a spatial coordinate system.

20. A method for capturing data, the method comprising:
  receiving, by a data capture system, signal data from a global navigation system;
  processing the signal data, wherein the processing comprises determining a time associated with the signal data;
  synchronizing one or more sensors of the data capture system, wherein the synchronizing comprises aligning the one or more sensors in pose and position with respect to a rigid frame;
  using the one or more sensors, acquiring environmental data from an environment, wherein the environmental data is used to construct a geometry representing the environment; and
  providing feedback associated with the acquired environmental data, wherein the feedback comprises a three-dimensional representation of the environment.

* * * * *